Jan. 15, 1946. W. C. HASSELHORN 2,393,105
ADAPTOR
Filed May 22, 1943 3 Sheets-Sheet 1
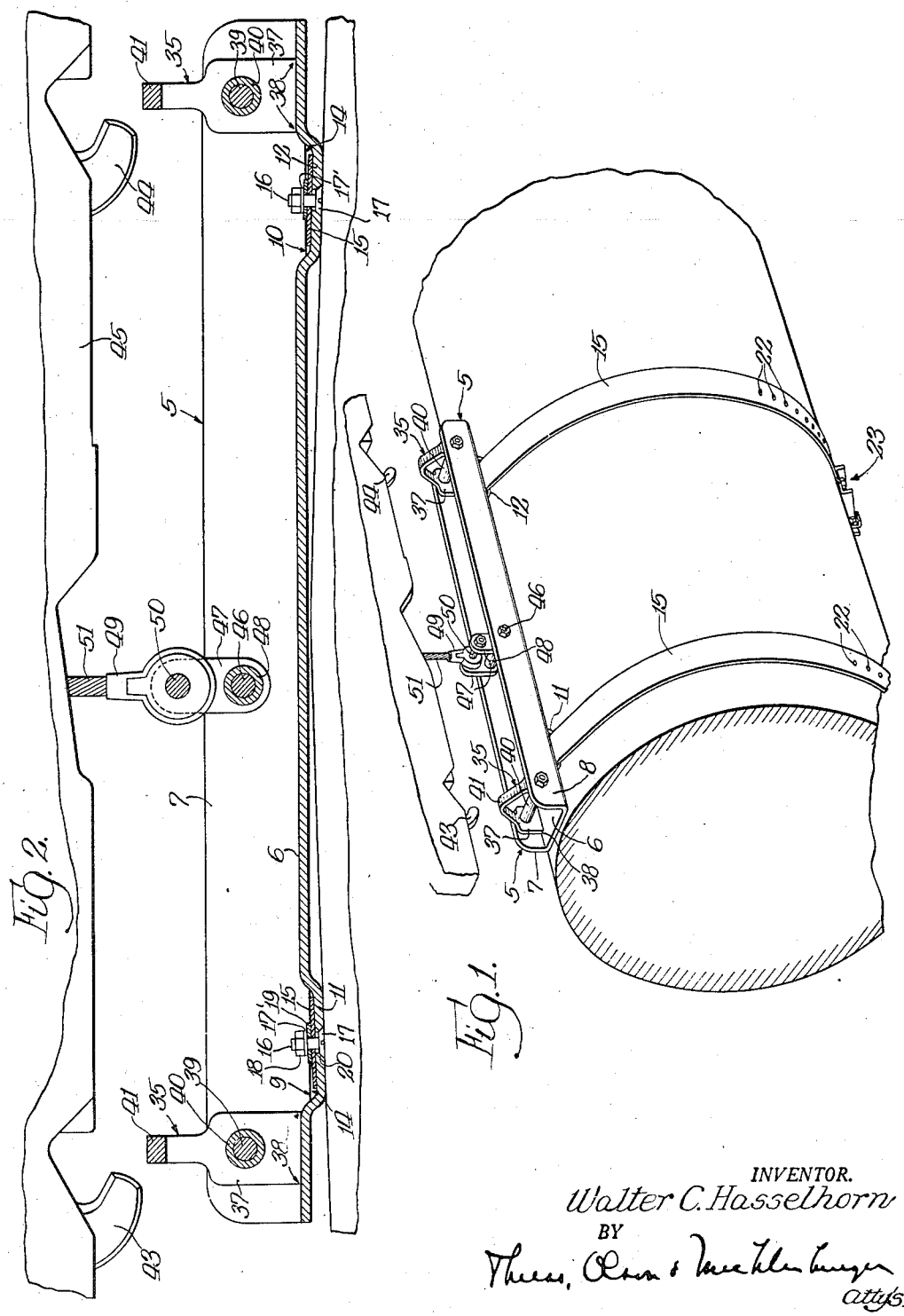
INVENTOR.
Walter C. Hasselhorn
BY
attys.

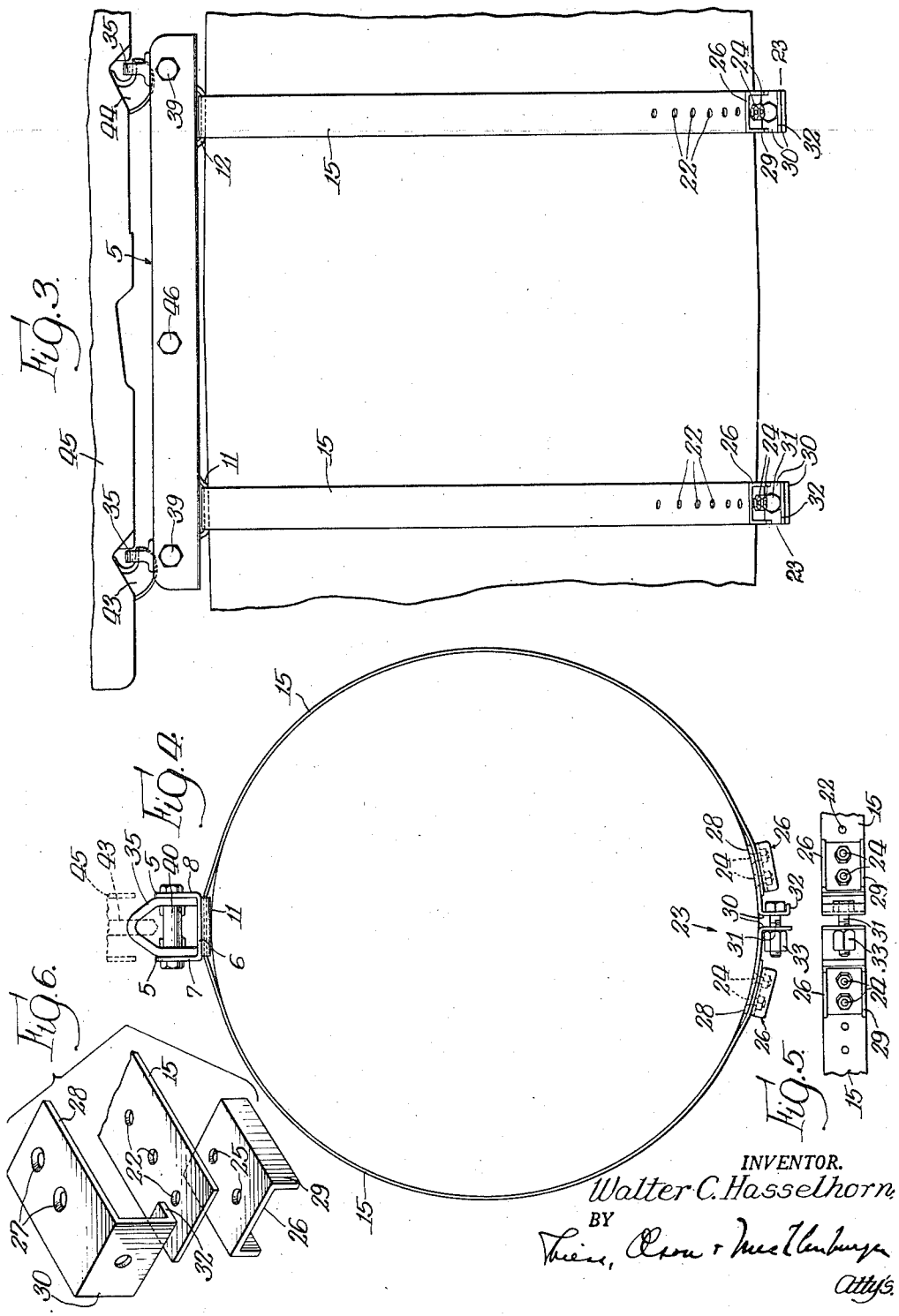

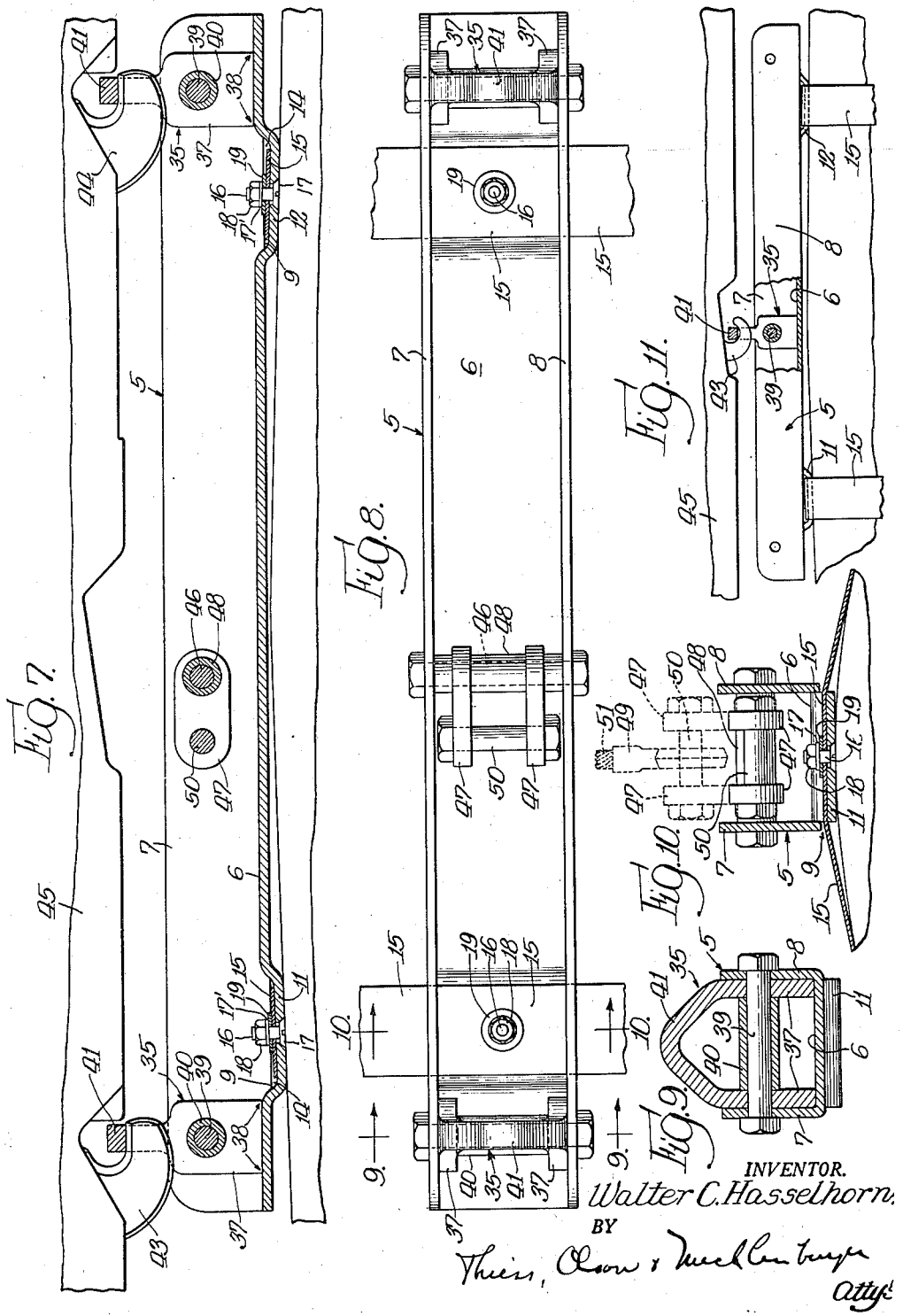

Patented Jan. 15, 1946

2,393,105

UNITED STATES PATENT OFFICE 2,393,105

ADAPTER

Walter C. Hasselhorn, Chicago, Ill., assignor to Cook Electric Company, Chicago, Ill., a corporation of Illinois Application May 22, 1943, Serial No. 488,039

8 Claims. (Cl. 89—1.5)

This invention relates to adapter apparatus for use in attaching bombs or cargo loads to the shackle or rack suspension employed in bomb bays and under the wings in different types of airplanes or wherever the apparatus may be advantageously used.

The invention particularly contemplates a structure that is simple and inexpensive and may be readily used to carry various types of bombs and cargo loads in practically all types of planes or ships.

It will be understood that, among other things, one of the features of the invention resides in the ability quickly to attach the adapter apparatus herein disclosed to a bomb and to allow the same to remain about the bomb while being carried, or to attach the adapter apparatus to a cargo load so that it may be readily carried by any type of plane and be readily jettisoned if the occasion should so require.

It is generally known that variations in the design and construction of bombs and in the equipment provided for carrying the same in airplanes create considerable difficulty in keeping an adequate supply of bombs available for the different ships that may arrive at outlying posts for servicing. These variations often cause delays that are fatal because bombs having the proper suspension mountings are not available. Many bombs and suspension mountings are designed for a two point attachment, while others are designed for a one point attachment. Quite obviously a single suspension lug bomb cannot be mounted upon a double suspension lug rack or shackle and vice versa.

Moreover, many emergency calls arise both for planes and for cargo to be carried by air transport, and difficulty is experienced in meeting the requests. Airplanes not specifically designed to carry cargo are sometimes required to make trips over which cargo could be advantageously transported. These airplanes are therefore compelled to make the trip with little if any cargo at an expense which might include the carrying of cargo, if it were possible, particularly in time of emergency or of combat between countries when hazardous trips are necessary and quick shipment of materials is demanded. Whatever the situation may be, many occasions arise constantly making it advantageous to carry cargo by airplanes not designed for this purpose but which might jettison the cargo if flight conditions should require for the safety of the plane.

The invention is directed to providing an improved structure that may be used wherever the suspension mounting of the plane requires the opposite type of lug suspension so that bombs having either single and double suspension lugs may be readily used, or whereby cargo other than bombs may be transported by combat planes, or even by other types of planes, when such planes may be called upon for this purpose, the apparatus preferably, although not necessarily, being of the construction that permits ready jettisoning of the cargo load if necessary.

A further object of the invention is to provide a very simple and efficient structure. This structure is designed and constructed to perform its service in an efficient way. In actual use, it has been found to have little, if any, wind deflecting characteristics so that it may be left about the bomb when released for a target, and, if any deflection is present, it is so negligible that it may be accounted for in the calculations before the bomb is released. The structure is rigid and strong and sufficiently inexpensive that its loss with the bomb may be disregarded.

A still further object of the invention is to provide improved apparatus of the character disclosed embodying what may be termed an adapter bar or member preferably reinforced or otherwise strengthened to suspend the weight of the load and to keep the load tightly held thereagainst by circumferential straps or bands encircling the load, said straps being of a type that permits adjustment circumferentially about the load and of quick and easy application.

The employment of adapter apparatus embodying the present invention novelly permits attaining the important feature of the invention because the apparatus universally fits all types of bombs or missiles and may be likewise used to attach cargo loads in a similar manner on all designs and types of ships. Different sizes or styles are not required, and consequently, the investment in material will not be increased.

The ready adaptability of the apparatus for use in one of a number of ways to accomplish a number of different purposes is an important feature of the invention.

Other objects and advantages of the invention will be readily apparent from the following detail description when taken in connection with the accompanying drawings.

In the drawings:

Figure 1 is a perspective view of an adapter and band structure embodying the invention mounted about a bomb or cargo load to illustrate how the adapter and band structure are attached and used to lift the bomb or cargo load to loading position upon a rack carried by the ship;

Fig. 2 is an enlarged elevational view of a portion of the rack and a longitudinal sectional view of the adapter, the arrangement illustrating the adapter about to be hooked to the rack;

Fig. 3 is a view illustrating the bomb or cargo load in loaded position upon the rack;

Fig. 4 is an end view of a bomb or cargo load showing the adapter and the band structure mounted circumferentially about the bomb;

Fig. 5 is a detail view of the band connection shown at the lower end of the bands in Figs. 3 and 4;

Fig. 6 is an exploded view of the adjustable means permitting fitting the band to different size bombs or cargo loads;

Fig. 7 is an enlarged longitudinal section of the adapter attached to a bomb, a portion only of the bomb or cargo load being shown with the adapter attached to the rack in loaded position;

Fig. 8 is a top plan view of the adapter illustrating the bands secured thereto;

Fig. 9 is a transverse section taken along line 9—9 of Fig. 8;

Fig. 10 is a transverse section taken along line 10—10 of Fig. 8; and

Fig. 11 illustrates the manner of attaching the adapter to a rack when the bomb or cargo load is to be carried by a single point suspension.

As illustrated in Figs. 1 to 5, inclusive, adapter apparatus embodying the invention includes a longitudinally disposed adapter bar 5 that may be reinforced in any suitable way to form a rigid suspension supporting member, the drawings illustrating this adapter bar in the form of a channel having a floor 6 and opposite side walls 7 and 8. Adapter bar 5 may be of metal or other suitable material and formed with its floor 6 cut at 9 and 10, preferably although not necessarily at the intersection of the side walls 7 and 8 with the floor 6, and offset at 11 and 12. These offset portions 11 and 12 provide along their lines of severance with the side walls 7 and 8 spaces designated 14 in both instances through which circumferential bands 15 are passed and secured by bolts 16 having countersunk heads 17 and nuts 18 threaded thereon, which bolts 16 are designed to pass through apertures in the bands 15. Washers 19 and lock washers 17' are also provided.

Circumferential bands 15 are adapted to encircle the bomb, as shown in Fig. 1 for the purposes of illustration only, and, when a cargo load is adapted to be carried instead, they will encircle the container or package irrespective of its contour. Bands 15 may be made of sufficiently flexible material to permit their shaping to the contour of the object to be carried and of inexpensive material to permit disposing of the same after they have been used if it has been necessary to distort the same by sharp bending at corners. These bands are provided so that they may be used for bombs and packages of different circumferences. As illustrated, they are perforated at 22 for a given distance whereby fastening means designated 23 broadly may be adjustably positioned at the ends. If these bands are too long for the circumference of the bomb or package, the ends may be cut so that the last two perforations 22 may be aligned with and receive bolts 24 passing through apertures 25 in connectors 26 and apertures 27 in clips 28. Connectors 26 may have side flanges 29 and the apertures 27 in clips 28 may be countersunk to receive the heads of bolts 24, thereby to provide a continuously smooth inner face for each clip 28 that may lie against the periphery of the bomb. Clips 28 have downwardly extending flanges 30 through which extend bolts 31. The lower part of the flange 30 receiving the head of bolt 31 is turned inwardly at 32 whereby to guide the bolt head and prevent it from turning when the nut 33 is moved along the bolt 31.

From the foregoing description, it will be apparent that bands 15 may be placed about the bomb or cargo load and readily pulled tightly by means of the bolts 31. The adapter bar 5 will also be tightly held in place against the bomb or cargo load by the bands 15 passing through the spaces 14 and over the offset portions 11 and 12.

Offset portions 11 and 12 may be formed to slope slightly, as clearly shown in Fig. 2, so that their outer faces lie flush with the surface of the bomb or cargo load if it should slant slightly according to the contour design of the bomb or cargo load. This provides a surface engagement that firmly grips against the bomb or cargo load and prevents any rocking or twisting of the adapter bar 5 after the bands 15 are drawn tightly against the bomb or cargo load. Otherwise, the offset portions are not sloped slightly as shown but are offset to lie parallel to the base 6.

One or more suspension straps 35 may be disposed upon adapter bar 5. Suspension straps 35 may be placed between side walls 7 and 8 of bar 5 and so mounted that they will be firmly positioned. Preferably, straps 35 are of U shape with enlarged legs 37 provided with right angle corners 38 between the side edges and the bottom edge. The bottom edge is adapted to seat firmly upon the floor 6 of adapter 5 to prevent any rocking of straps 35 on bolts 39 on which they are mounted. Spacer sleeves 40 are also carried by bolts 39 to brace side legs 37 and hold them apart and against side walls 7 and 8. The function of these sleeves is to prevent side legs 37 from moving toward each other on bolts 39 under the strain of the load being carried. Whether these sleeves keep the side legs against the side walls 7 and 8 is not material except that the arrangement provides a firm support for the straps 35.

Straps 35 are reduced to form a narrower central part 41 between side legs 37 to receive the fingers 43 and 44 of a rack mechanism 45, which may be of any desirable construction usually designed to release the bomb load automatically by operation of suitable controls within the airplane. The releasing fingers 43 and 44 as well as the rack mechanism 45 are shown diagrammatically and it is intended that in this regard any suitable mechanism may be used. In so far as the adapter apparatus is concerned, it is quite apparent that the invention may be embodied where suspension devices of any design are used. It will be understood that the shackle type of suspension may be employed as well as the rack type where planes equipped with the same are used either to carry bombs or cargo.

The bolts 39 are disposed at opposite ends of adapter bar 5 where the bomb or cargo load is to be carried by a two support suspension. In this case, another bolt 46, similar to bolts 39, is disposed midway and in walls 7 and 8 to carry bar straps 47 separated by a sleeve 48. A cable hoist fitting 49 is mounted upon a bolt 50 inserted through the upper part of straps 47. By means of a hoist cable 51, the bomb or load may be lifted in position for either outboard or inboard loading, the cable bringing the load to a point where the straps 35 hook onto the releasing fingers 43 or the like, whereupon the bolt 50 may be removed to detach the cable fitting 49. If the hoist cable fitting 51 is in the form of a clasp, removing the bolt 50 is not necessary.

Fig. 7 illustrates lugs 35 of adapter bar 5 attached to releasing fingers 43 of the rack 45 while Fig. 2 illustrates the hoist cable 51 raising the load.

In the event the rack or other mechanism employed provides a single point suspension for the bomb or load, it is only necessary to employ one of the lugs 35, it being removed from a bolt 39 and mounted upon bolt 46. Bolt 46 is disposed at the same height from floor 6 of adapter bar 5 as are bolts 39, so that the lower edge of the lug 35 will abut or rest directly against floor 6 to keep the lug 35 from turning about bolt 46.

The simple form of the rigidly constructed adapter 5 and the inexpensive flexible bands 15 will permit the apparatus to be widely used and to readily convert a combat or ordinary airplane temporarily into a cargo plane to gain the advantage of a flight that it must take or to use other than a cargo airplane to carry cargo when it becomes imperative. The cost of the apparatus is not appreciable and its loss need not be considered when employed about a bomb or about a cargo load that requires jettisoning. It is designed to reduce wind resistance, that is to say, it may be streamlined with the bomb or cargo load so that its deflection characteristic is so low that it may easily be taken into consideration in calculating the descent of the bomb.

The novelty of the rigid adapter bar 5 reinforced as it is by side walls between which rigidly supported suspension lugs that cannot rock are supported and of the use of flexible bands that encircle the load package and connect to the adapter bar 5 by passing through slitted openings and over the floor of the bar will be apparent. The bands are readily adjustable by virtue of the type of bolt connection used to draw the bands tightly about the load. The adjustment may be readily and conveniently made and hence only a single length of band need be furnished if so desired. The connectors 26 and the clips 28 are simply made and admit of a secure mounting upon the end of the bands so that they will hold against the strain of the load and prevent the bands from slipping sidewise or being released accidentally. If the length of band is too long, the band may be easily cut to proper size and the next two apertures 22 can be used.

The advantages of the arrangement cannot be too strongly emphasized because it permits the use of differently designed and even foreign types of bombs with rack and shackle suspensions that normally will not permit their use. In other words, delays in shipments of the proper bombs are overcome by allowing the use of any type of bomb that may be available. Again, the cargo carrying feature is also important because any kind of ship may be immediately used to carry cargo, and, if necessary, the cargo can be jettisoned. On the other hand, the fuel supply of a ship can be increased to increase its flight mileage by carrying drums of fuel attached by the adapter apparatus herein disclosed and thereafter the drums may be jettisoned to lighten the weight of the ship when the fuel therein has been consumed.

Without further elaboration, the foregoing will so fully explain the gist of the invention that others may, by applying current knowledge, readily adapt the same for use under varying conditions of service, without eliminating certain features which may properly be said to constitute the essential items of novelty involved, which items are intended to be defined and secured to me by the following claims.

I claim:

1. Adapter apparatus for use in mounting an aerial bomb or cargo load comprising a channel member adapted to be positioned longitudinally along the periphery of the bomb or cargo load with the base of the channel member disposed toward the periphery of the bomb or cargo load, a plurality of flexible bands extending circumferentially about the bomb or cargo load, said channel member being slitted on opposite sides substantially at the intersection of the base and the side walls to receive said bands, said base being offset below said slits to provide a surface engagement at said offset positions between said channel member and the bomb or cargo load, and means for attaching said channel member in suspended relation, said last means being carried by said channel member.

2. Adapter apparatus for use in mounting an aerial bomb or cargo load comprising a channel member adapted to be positioned longitudinally along the periphery of the bomb or cargo load with the base of the channel member disposed toward the periphery of the bomb or cargo load, a plurality of flexible bands extending circumferentially about the bomb or cargo load, said channel member being slitted in opposite sides substantially at the intersection of the base and the side walls to receive said bands, said base being offset below said slits and slanting to conform to the contour of the bomb or cargo load whereby to provide a surface engagement at said offset portions between said channel member and the bomb or cargo load, and means for attaching said channel member in suspended relation, said last means being carried by said channel member.

3. Adapter apparatus for use in mounting an aerial bomb or cargo load comprising a channel member adapted to be positioned longitudinally along the periphery of the bomb or cargo load with the base of the channel member disposed toward the periphery of the bomb or cargo load, a plurality of flexible bands extending circumferentially about the bomb or cargo load, means for connecting said bands to said base of said channel member, and means for attaching said channel member in suspended relation, said means comprising a strap disposed between the sides of said channel member and so constructed and arranged as to prohibit rock movement between the same and said channel member.

4. Adapter apparatus for use in mounting an aerial bomb or cargo load comprising a channel member adapted to be positioned longitudinally along the periphery of the bomb or cargo load with the base of the channel member disposed toward the periphery of the bomb or cargo load, a plurality of flexible bands extending circumferentially about the bomb or cargo load, means for connecting said bands to said base of said channel member, and means for attaching said channel member in suspended relation, said means comprising a U-strap disposed between the side walls of said channel member and having the lower edges of the opposite vertical legs of the U engaging said base to prevent relative rock movement between said strap and said channel member.

5. Adapter apparatus for use in mounting an aerial bomb or cargo load comprising a channel member adapted to be positioned longitudinally along the periphery of the bomb or cargo load with the base of the channel member disposed toward the periphery of the bomb or cargo load, a plurality of flexible bands extending circumferentially about the bomb or cargo load, means for connecting said bands to said base of said channel member, and means for attaching said channel member in suspended relation, said means comprising a U-strap disposed between and bolted to the side walls of said channel member, the vertical legs of said U-strap being braced to prevent movement relative to each other, the lower edges of said vertical legs resting upon said base and having substantially right angle corners that prevent relative rock movement between said U-strap and said base.

6. Adapter apparatus for use in mounting an aerial bomb or cargo load comprising a channel member adapted to be positioned longitudinally along the periphery of the bomb or cargo load with the base of the channel member disposed toward the periphery of the bomb or cargo load, a plurality of flexible bands extending circumferentially about the bomb or cargo load, said channel member being slitted on opposite sides to receive said bands, said bands passing through said slits and over said base, means for securing said bands to said base, and means for attaching said channel member in suspended relation, said means comprising a U-strap disposed between the side walls of said channel member and having the edges of the opposite vertical legs of the U engaging said base to prevent relative rock movement between said strap and said channel member.

7. Adapter apparatus for use in mounting an aerial bomb or cargo load comprising a channel member adapted to be positioned longitudinally along the periphery of the bomb or cargo load with the base of the channel member disposed toward the periphery of the bomb or cargo load, a plurality of flexible bands extending circumferentially about the bomb or cargo load, said channel member being slitted on opposite sides to receive said bands, said bands passing through said slits and over said base, means for securing said bands to said base, and means for attaching said channel member in suspended relation, said means comprising a plurality of interchangeable U-straps each including a removable bolt carried in the opposite side walls of said channel to carry the U-strap thereon in braced relation to prevent relative movement between the vertical legs of the U-strap, each U-strap having means preventing relative rock movement between its said vertical legs and said channel member.

8. Adapter apparatus for use in mounting an aerial bomb or cargo load comprising a channel member adapted to be positioned longitudinally along the periphery of the bomb or cargo load with the base of the channel member disposed toward the periphery of the bomb or cargo load, a plurality of flexible bands extending circumferentially about the bomb or cargo load, said channel member being slitted on opposite sides to receive said bands, said bands passing through said slits and over said base, means for securing said bands to said base, and means for attaching said channel member in suspended relation, said means comprising a plurality of interchangeable U-straps each including a removable bolt carried in the opposite side walls of said channel to carry the U-strap thereon, there being means to prevent relative rock movement between its said vertical legs and said channel member.

WALTER C. HASSELHORN.